United States Patent [19]
Matsumoto et al.

[11] Patent Number: 5,730,562
[45] Date of Patent: Mar. 24, 1998

[54] CLAMPING APPARATUS FOR A SPINDLE OF A MACHINE TOOL

[75] Inventors: Masakazu Matsumoto; Yusaku Yamamoto; Hisashi Ide, all of Osaka, Japan

[73] Assignee: Nikken Kosakusho Works, Ltd., Osaka-Fu, Japan

[21] Appl. No.: 701,714

[22] Filed: Aug. 22, 1996

[30] Foreign Application Priority Data

Sep. 13, 1995 [JP] Japan ................. 7-234898

[51] Int. Cl.⁶ ................. B23C 5/26; B23B 31/00
[52] U.S. Cl. ................. 409/233; 408/239 R
[58] Field of Search ................. 409/233, 232; 408/238, 239 A, 239 R; 279/58, 57

[56] References Cited

U.S. PATENT DOCUMENTS

| | | | |
|---|---|---|---|
| 3,868,886 | 3/1975 | Bondie | 409/233 |
| 4,131,054 | 12/1978 | Johnson et al. | 409/233 |
| 5,660,510 | 8/1997 | Taniguchi et al. | 409/233 X |

FOREIGN PATENT DOCUMENTS

| | | | |
|---|---|---|---|
| 339321 | 11/1989 | European Pat. Off. | 409/233 |
| 219137 | 2/1985 | Germany | 409/233 |
| 199308 | 9/1987 | Japan | 409/233 |

Primary Examiner—William R. Briggs
Attorney, Agent, or Firm—Ladas & Parry

[57] ABSTRACT

An article clamping apparatus is designed to compulsorily open the front end portions of divided pieces of a collet and to allow the divided pieces of the collet to securely hold a pull stud of a tool holder. A draw bar is fitted into a spindle of the machine tool, and a support sleeve is disposed to surround the draw bar via the collet. A separator is disposed on the front side of the support sleeve and fixed to the spindle together with the support sleeve. The positioning plates provided on the separator are engaged with slit grooves of the support sleeve and inserted between the divided pieces of the collet. Upon advancement of the draw bar, the divided pieces are advanced, so that the front end slat surfaces of the divided pieces contact the slant surfaces of the collet opening projections provided on the separator so as to compulsorily open the front portions of the divided pieces. Subsequently, the engagement portion of the pull stud is inserted into the front portion of the collet, and the draw bar is retracted, so that the engagement portion of the pull stud is engaged with the front inside projections of the divided pieces.

6 Claims, 7 Drawing Sheets

CLAMPING APPARATUS FOR A SPINDLE OF A MACHINE TOOL

BACKGROUND OF THE INVENTION

1. Field of the Invention

The present invention relates to an article clamping apparatus which is used for clamping an article, such as a tool holder which holds a tool, to a spindle of a machine tool such as a machining center.

2. Discussion of Related Art

Conventionally, a clamping apparatus has been used to clamp a tool holder, to which a tool is inserted and fixed, to the front end of a spindle of a machine tool. That is, the tapered shank of the tool holder is fitted into the front end of the spindle, and an engagement portion of a pull stud projecting from the rear end of the tapered shank is engaged with a draw bar carried by the spindle via an engagement member. Subsequently, the draw bar is drawn rearward by a number of disk springs.

In such a clamping apparatus, it is preferred to increase the drawing force which is applied to the pull stud by the draw bar. However, when the number of disk springs is increased so as to increase the drawing force, the entire length of the spindle increases. Moreover, when disk springs which generate larger forces are used, the disk springs tend to fatigue and deteriorate.

In order to solve the above-described drawbacks, a force-increasing mechanism utilizing a plurality of balls is provided at the rear end of the draw bar. Alternatively, a force-increasing mechanism is provided between the draw bar and a collet which is attached to the front end of the draw bar. In the latter force-increasing mechanism, a projection projecting from the rear-end inner circumferential surface of the collet is engaged, through tapered surfaces, with a projection projecting from the outer circumferential surface of the draw bar.

When the former clamping apparatus having a force-increasing mechanism at the rear end of the draw bar is employed, the drawing force is theoretically increased. However, in actual practice, the draw bar becomes longer, and a sufficient effect cannot be obtained. When there is employed the latter clamping apparatus in which a projection of the rear inner circumferential surface of the collet is engaged, through tapered surfaces, with a projection from the outer circumferential surface of the draw bar so as to provide a force-increasing mechanism at the front portion of the draw bar, no mechanism is provided so as to compulsorily open and close the front and rear portions of the collet. Also, the collet is divided into a plurality of pieces; for example, four pieces in the circumferential direction. Therefore, unnatural forces act on the collet, resulting in damage to the collet and other parts.

SUMMARY OF THE INVENTION

An object of the present invention is to solve the above-described problems and to provide a clamping apparatus for clamping an article, such as a tool holder attached to a spindle, in which a force-increasing mechanism provided at the front portion of a draw bar has been improved so as to compulsorily open the front portion of the collet when the draw bar is advanced, and the rear end portion of the collet is urged to reduce the diameter, thereby preventing the collet from being damaged.

To achieve the above object, according to a first aspect of the present invention, there is provided an article clamping apparatus for a spindle of a machine tool, which comprises a draw bar which is inserted into a spindle of a machine tool so as to be advanced and retracted, a collet consisting of a plurality of divided pieces which are arranged in the circumferential direction and which are capable of being opened and closed, the collet being fitted onto the outer circumference of a front portion of the draw bar, a support sleeve which is disposed to surround the collet and is fixed to the spindle, and a separator which is fixedly provided within the spindle so as to be situated on the front side of the support sleeve.

A tapered portion such as a taper shank of an article such as a tool holder is fitted into a tapered bore formed in the front end portion of the spindle, so that the larger-diameter engagement portion provided at the rear end of the shaft portion such as a pull stud projecting rearward from the tapered portion is engaged with the front inside projections of the collet. When the draw bar is urged rearward by a spring such as a disk spring, the draw bar and the collet are drawn. As a result, the first gently slanted surface, which is formed on the outer circumferential surface of the engagement portion of the draw bar such that the outer diameter of the first slant surface decreases toward the rear side, and a second gently slanted surface, which is formed on the inner circumferential surface of the rear inside projection of each divided piece of the collet such that the inner diameter of the second slant surface decreases toward the rear side, are contacted with each other under pressure.

Therefore, the rear inside projections are pressed toward the outside by the engagement portion so as to clamp the article such as a tool holder. Further, the rear outside projection of each divided piece is contracted, under pressure, with the rear end tapered surface of the support sleeve fixed to the spindle. Accordingly, a force-increasing mechanism can be formed at the front portion of the draw bar. The force-increasing mechanism allows to hold the engagement portion with an increased force a few times that of the disk springs, so that after clamping the engagement portion, the divided pieces can be securely fixed. Further, it becomes possible to reduce the fatigue of the spring such as a disk spring. It is preferred that the angle of each of the gently slanted surfaces formed on the engagement portion and the rear inside projection be about 10°.

The separator, which is fixed to the spindle together with the support sleeve so as to be disposed on the front side of the support sleeve, has positioning plates projecting rearward from the annular member. The positioning plates are inserted between the divided pieces of the collet so as to allow the divided pieces to advance and retract linearly while maintaining the clearances formed therebetween. Collet opening projections are disposed between the positioning plates such that they project from the annular member of the separator. When the draw bar is advanced, the front end portion of the draw bar engages the engagement projections provided in the inner circumferential surfaces of the divided pieces of the collet, so that the draw bar and the collet are advanced. As a result, the front end slant surface, which is formed at the front end of each divided piece of the collet and whose diameter decreases toward the rear side of the collet engages the outer slant surface of the collet opening projection, so that the front outside projection of each divided piece is compulsorily pushed into the larger-inner-diameter portion provided in the front end portion of the support sleeve. As a result, the front portion of the collet is opened. By maintaining this state, it becomes possible to prevent the engagement portion provided at the rear end of the shaft portion such as a pull stud and the front inside projections of the divided pieces from being damaged due to interference therebetween, and to allow the engagement portion to be reliably inserted into and removed from the front inside projections.

Preferably, the slant angle of the outer slant surface of each collet opening projection is slightly larger than that of the slant angle of the corresponding slant surface of each divided piece. For example, the outer slant surface of each collet opening projection is slanted at an angle of 50° and the outside slant surface of each divided piece of the collet is slanted at an angle of 45° with respect to the center axis.

According to the second aspect of the present invention, in the article clamping apparatus of the first aspect, a rear end projection is provided on the rear side of the rear inside projection and the rear outside projection of each divided piece of the collet, and an annular coil spring is fitted into a groove formed in the outer circumferential surface of the rear end projection so as to urge the rear portion of the collet in a direction such that the diameter of the collet decreases. Accordingly, when the draw bar and the collet are retracted, the rear end portions of the divided pieces are prevented from expanding, and the divided pieces are retracted together with the draw bar without separating from each other. Further, when the collet is advanced, the annular spring expands the front end portions of the divided pieces, thereby assisting the operation to push the front outside projections of the divided pieces into the larger-inner-diameter portion of the support sleeve.

According to the third aspect of the present invention, in the article clamping apparatus of the first aspect or the second aspect, a fluid feed pipe communicating with a fluid supply hole formed at the center portion of the draw bar is inserted into the front portion of the draw bar, and a press spring is disposed within the draw bar so as to urge the fluid feed pipe forward. Further, the engagement portion provided at the rear end of the shaft portion such as a pull stud is removably inserted into a front end portion of the fluid feed pipe. While the article is in a clamped state, pressurized fluid such as cutting fluid or air discharged from a fluid supply source is fed to a fluid passage formed within the article such as a pull stud and a tool holder via the fluid supply hole and the fluid feed pipe. The fluid is supplied to the cutting edge portion of a tool attached to the tool holder and/or a portion of a workpiece machined by the cutting edge portion. Accordingly, it is possible to cool and lubricate the cutting edge portion of the tool and/or the portion of the workpiece which undergoes machining by using the cutting fluid and/or to remove chips adhering to the tool by using air.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A first embodiment of the present invention will now be described with reference to the drawings.

Figure 1:
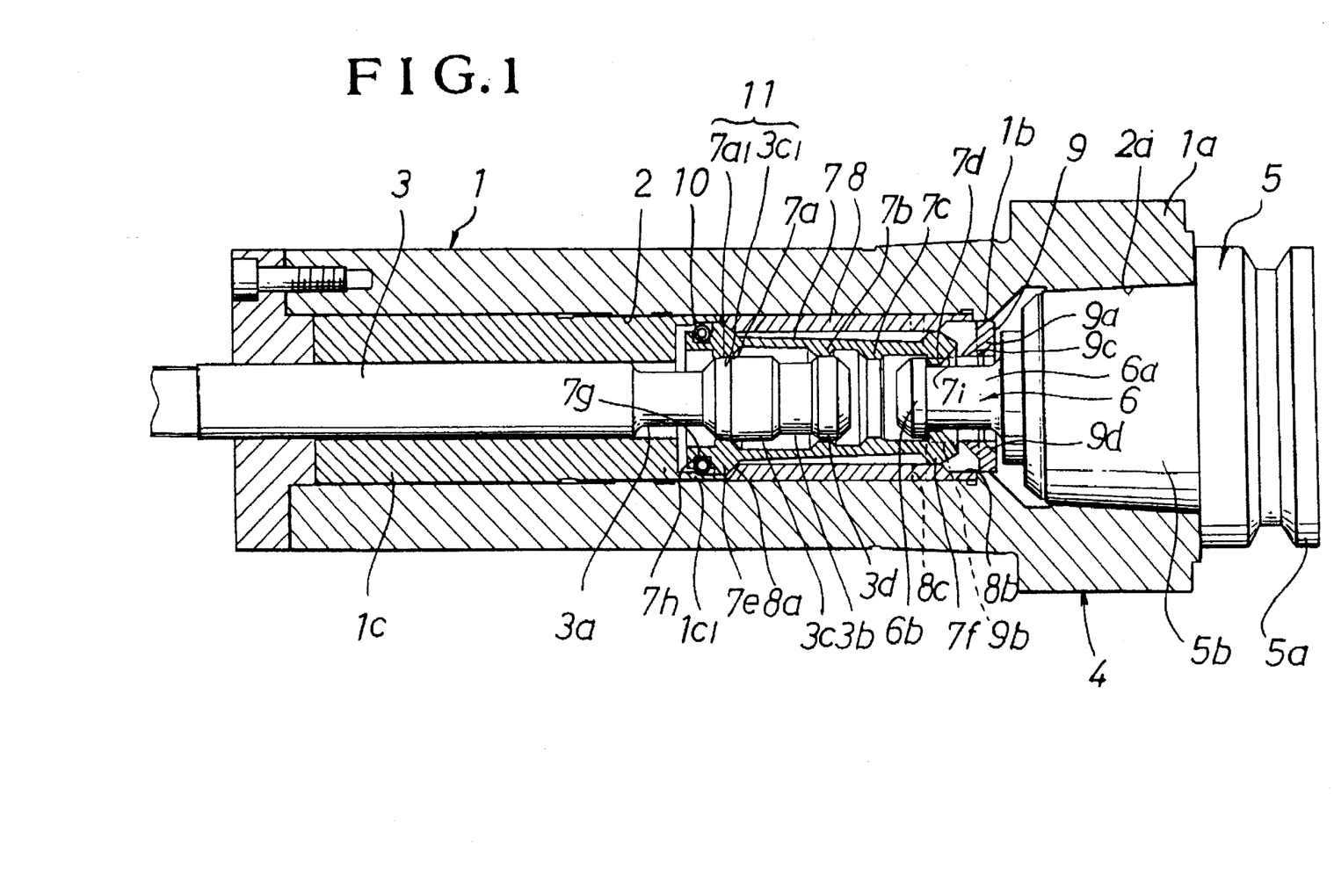
FIG. 1 is a longitudinal cross section of a main portion of an article clamping apparatus for a spindle according to a first embodiment of the present invention.

Referring to FIG. 1, numeral 1 denotes a spindle of a machine tool such as a machining center. A draw bar 3 is inserted into a through hole 2 formed in the spindle 1 such that the draw bar 2 is movable back and forth. At the rear portion of the draw bar 3 is provided a plurality of disk springs (not shown) which urge the draw bar 3 rearward. At the rear end of the draw bar 3 is disposed a hydraulic cylinder mechanism (not shown) which pushes the draw bar 3 forward. The spindle 1 is rotatably supported by a spindle head 4 of the machine tool.

In the front-end larger-diameter portion 1a of the spindle 1 is formed a tapered bore 2a which is continued to the forward end of the through hole 2 via an annular inner projection 1b. A tool holder 5 to which a tool (not shown) is attached is removably fitted into the tapered bore 2a. That is, a tapered shank 5b projecting from the rear side of the holding portion 5a of a tool holder 5 is attached to the tapered bore 2a. The rear surface of the inner projection 1b is perpendicular to the center axis of the spindle, and the front side of the inner projection 1b is slanted such that the inner diameter of the slanted portion increases toward the front of the spindle 1.

A pull stud 6 projects from the rear end of the taper shank 5b of the tool holder 5. The pull stud 6 has a shaft portion 6a and an engagement portion 6b, which is formed at the rear end of the shaft portion 6a and which has a diameter larger than that of the shaft portion 6a. The rear end portion of the engagement portion 6b has a truncated conical shape whose diameter decreases toward the rear side, while the front end surface of the engagement portion 6b extends outwardly from the rear end of the shaft portion 6a in a direction perpendicular to the axis of the shaft portion 6a.

In the through hole 2, a sleeve 1c is fixed to the spindle 1 at a proper position in the axial direction. The sleeve 1c has a larger-inner-diameter portion $1c_1$ at its front end portion. In the space within the through bore 2 and located on the front side of the sleeve 1c, a collet 7 is fitted onto the outer circumference of the front portion of the draw bar 3, a support sleeve 8 is provided to surround the collet 7, and a separator 9 is disposed on the front side of the support sleeve 8. The collet 7, the support sleeve 8, and the separator 9 are accommodated within the through hole 2 so as to be coaxial with one another.

On the outer circumferential surface of the front portion of the draw bar 3 is formed a rear-side annular groove 3a and a front-side annular groove 3b which is narrower than the rear-side annular groove 3a, thereby forming an engagement portion 3c between them. A front end portion 3d having a diameter slightly larger than that of the engagement portion 3c is provided on the front side of the front-side annular groove 3b. The front and rear end surfaces of each of the engagement portion 3c and the front end portion 3d are slanted at an angle of 45° with respect to the center axis. At the rear portion of the outer circumferential surface of the engagement portion 3c is formed a gently slanted surface $3c_1$ which is inclined at about 10° with respect to the center axis such that the diameter of the slanted surface $3c_1$ decreases toward the rear side.

Figure 2:
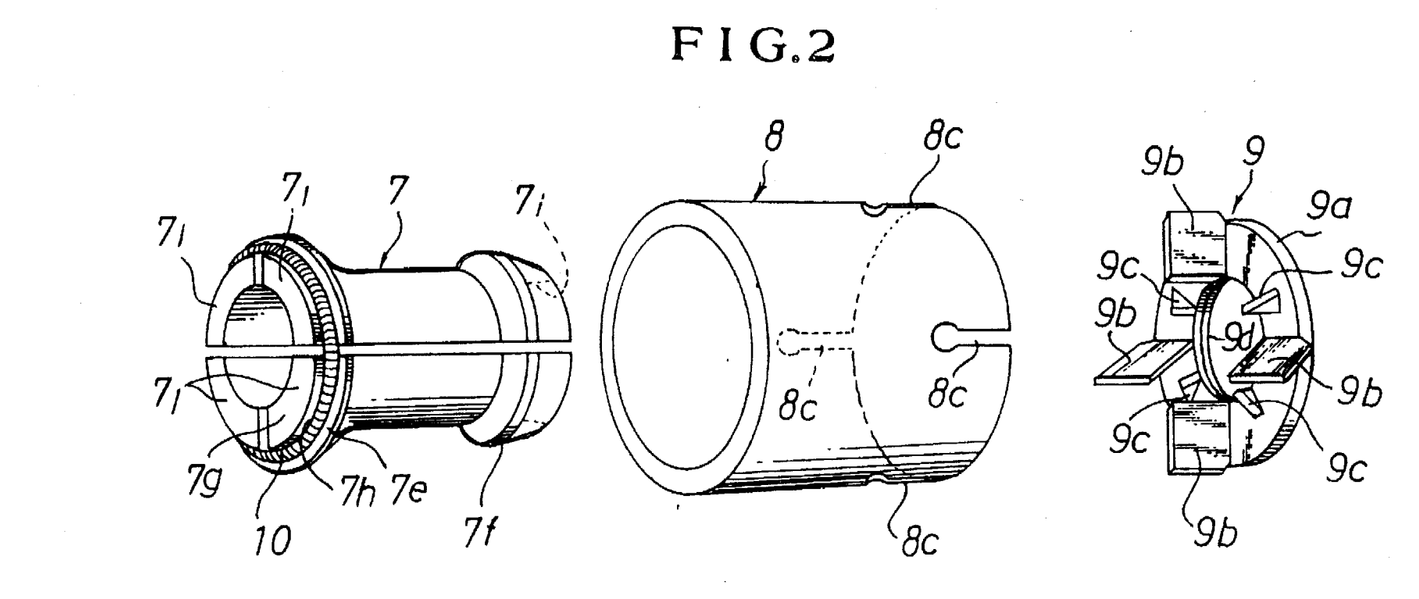
FIG. 2 is an exploded perspective view showing the collet, the support sleeve, and the separator of the article clamping apparatus shown in FIG. 1.

As is also shown in FIG. 2, the collet 7 is divided into four pieces $7_1$ in the circumferential direction. From the inner circumferential surface of each divided piece $7_1$, a rear inside projection 7a, a guide projection 7b, an engagement projection 7c, and a front inside projection 7d project, in this order, from the rear side to the front side. From the outer circumferential surface of each divided piece $7_1$, a rear outside projection 7e and a front outside projection 7f project so as to correspond to the rear inside projection 7a and the front inside projection 7d in the axial direction.

Each of the front end surface of the rear inside projection 7a, front and rear end surfaces of the guide projection 7b and the engagement projection 7c, the front end surface of the rear outside projection 7e, the front and rear end surfaces of he front outside projection 7f is slanted at an angle of 45° with respect to the center axis. In the front end surface of the front inside projection 7d is formed a front end slant surface 7i which is slanted at an angle of 45° with respect to the center axis and whose diameter decreases toward the rear side of the collet 7. The rear end surface of the front inside projection 7d extends perpendicularly to the center axis.

On the inner circumferential surface of each rear inside projection 7a is formed a gently slanted surface $7a_1$ which is slanted at an angle of about 10° with respect to the center axis and whose diameter decreases toward the rear side of the collet 7. This slant surface 7a engages the gently slanted surface $3c_1$ formed on the engagement portion 3c of the draw bar 3 so as to constitute a force-increasing mechanism 11.

Moreover, a rear end projection 7g projects from the rear side of the rear inside projection 7a and the rear outside projection 7e of each divided piece $7_1$ of the collet 7, and a groove 7h is formed in the outer circumferential surface of the rear end projection 7g.

The collet 7 is manufactured from a cylindrical metallic member. This cylindrical member is first subjected to cutting to form the above-described projections 7a–7g and groove 7h. Subsequently, the cylindrical member is cut in the longitudinal direction over the entire length thereof so as to divide it into four pieces. In this manner, the divided pieces $7_1$ of the collet 7 are manufactured. In the grooves 7h of the divided pieces $7_1$ of the collet 7 is received an annular coil spring 10, which urges the rear portions of the divided pieces $7_1$ in a direction such that the diameter of the collet 7 decreases. Both ends of the coil spring 10 are connected to each other to from its annular shape.

Figure 3:
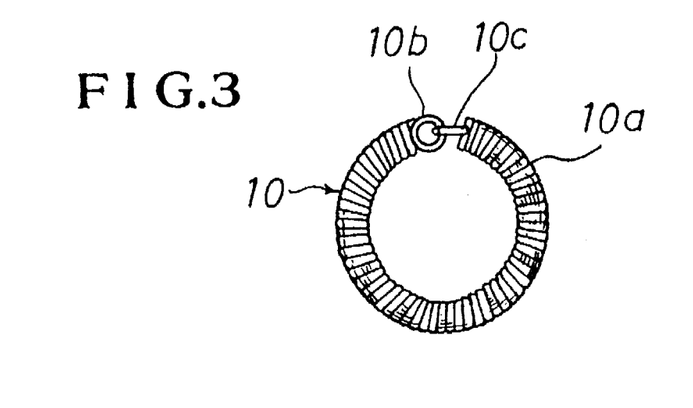
FIG. 3 is a front view of a coil spring used in the article clamping apparatus shown in FIG. 1.

The coil spring 10 is made in the manner shown in FIG. 3. An elastic metallic wire 10a is closely coiled, and is turned twice at either end of the coiled portion such that ring-shaped connecting portions 10b and 10c project from the coiled portion to be perpendicular to each other. These connecting portions 10a and 10b are engaged with each other to complete the annular coil spring 10.

As shown in FIGS. 1 and 2, the support sleeve 8 is made from a metallic cylindrical member. That is, a rear end tapered surface 8a is formed at the rear end portion of the cylindrical member such that the inner diameter of the tapered surface 8a increases toward the rear side of the cylindrical member. A larger-inner-diameter portion 8b is formed at the front end portion of the inner circumferential surface of the cylindrical member. Each of the rear end tapered surface 8a, the rear end surface of the larger-inner-diameter portion 8b is inclined at an angle of 45° with respect to the center axis. Four slit grooves 8c are formed in the front portion of the support sleeve 8 such that they are equally spaced in the circumferential direction and extend in the axial direction. The slit grooves 8c are opened to the front end of the cylindrical member.

The separator 9 made of a metal includes an annular member 9a, as shown in FIGS. 1 and 2. Four rectangular positioning plates 8b project from the rear surface of the annular member 9a such that they extend radially at constant intervals. The outermost ends of the positioning plates 9b project from the outer circumference of the annular member 9a. Collet opening projections 9c each having a right-angle triangular shape project from the rear surface of the annular member 9a such that each of the collet opening projections 9c is situated at the center between two adjacent positioning plates 9b.

The annular member 9a has a tapered hole 9d whose diameter increases toward the front side thereof, and the collet opening projections 9c are disposed around the tapered hole 9d such that the right-angle corner of each collet opening projection 9c is situated in the vicinity of the rear circumferential edge of the tapered hole 9d. One of two sides of each collet opening projection 9c located on both sides of the right angle corner thereof extends perpendicularly to the annular member 9a, and the other is fixed to the rear surface of the annular member 9a. The hypotenuse of the collet opening projection 9c is inclined at an angle of about 50° with respect to the center axis so as to provide outer slant surfaces whose height decreases toward the rear side.

The separator 9 and the support sleeve 8 are fit into the front portion of the through hole 2 formed in the spindle 1 in the following manner. The front ends of the positioning plates 9b of the separator 9 are contacted with the rear end surface of the inner projection 1b of the spindle 1, the positioning plates 9b are engaged with the slit grooves 8c of the support sleeve 8, and the front end of the support sleeve 8 is contacted with the rear end surface of the inner projection 1b.

The collet 7 to which the coil spring 10 has been attached is inserted into the support sleeve 8, and the positioning plates 9b of the separator 9 are inserted between the divided pieces $7_1$ of the collet 7. The support sleeve 8 and the separator 9 are fixed to the front portion of the spindle 1 by the inner projection 1b of the spindle 1 and a sleeve 1c.

Next, a description will be given of use of the article clamping apparatus for a spindle according to the first embodiment.

Figure 4A:
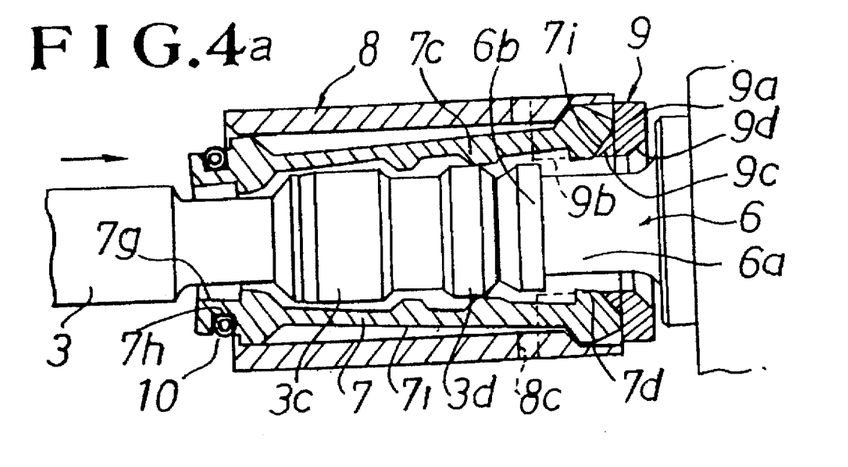
FIGS. 4a–4c are explanatory views of the article clamping apparatus shown in FIG. 1 which show a clamping operation.

When the hydraulic cylinder mechanism is operated so as to advance the draw bar 3 against the spring force of the plurality of disk springs, the front end portion 3d of the draw bar 3 is engaged with the engagement portions 7c of the divided pieces $7_1$ of the collet 7, as shown in FIG. 4a. At this advanced position, the front end slat surfaces 7i of the front inside projections 7d are supported by the outer slant surfaces of the collet opening projections 9c of the separator 9. Since the diameter of the front end slant surfaces 7i decreases toward the rear side, the front-end side of the divided pieces $7_1$ of the collet 7 are opened and are maintained in a slanted state.

In this state, the holding portion 5a of the tool holder 5, which is an article, is held by an operation of an unillustrated automatic tool changer, and is inserted into the taper bore 2a of the spindle 1, so that the shaft portion 6a of the pull stud 6 projecting from the rear end of the taper shank 5b is inserted into the annular member 9a of the separator 9 with clearance (see FIG. 1). As a result, the engagement portion 6b provided at the rear end of the shaft portion 6a is positioned on the rear side of the front inside projections 7d of the divided pieces $7_1$ of the collet 7, and the rear end surface of the engagement portion 6b is caused to abut the front surface of the front end portion 3d of the draw bar 3.

Figure 4B:
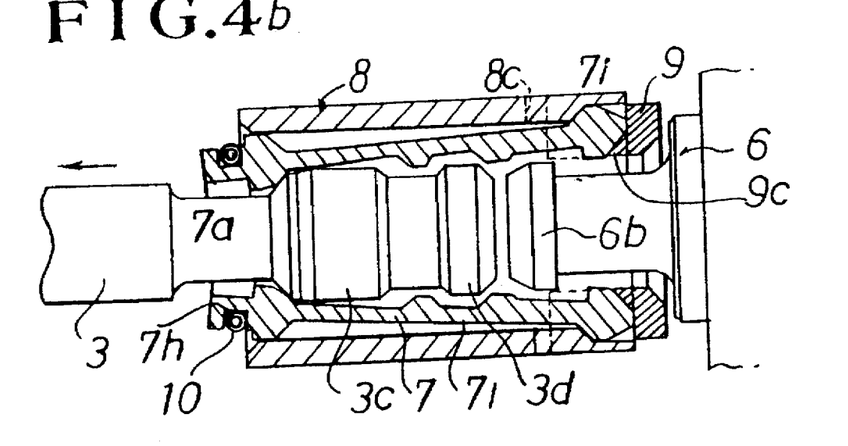

When the operation of the hydraulic cylinder mechanism is canceled after the automatic tool changer has released the holding portion 5a of the tool holder 5, the draw bar 3 is retracted by the spring force of the plurality of disk springs, so that the rear end surface of the engagement portion 3c of the draw bar 3 is supported by the front end surfaces of the rear inside projections 7a of the divided pieces $7_1$ of the collet 7, and the front end portion 3d of the draw bar 3 is positioned on the rear side of the engagement projections 7c of the divided pieces $7_1$. As a result, the front end portion 3d of the draw bar 3 is slightly separated rearward from the engagement portion 6b of the pull stud 6. The automatic tool changer which has released the holding portion 5a is returned to the original position.

Figure 4C:
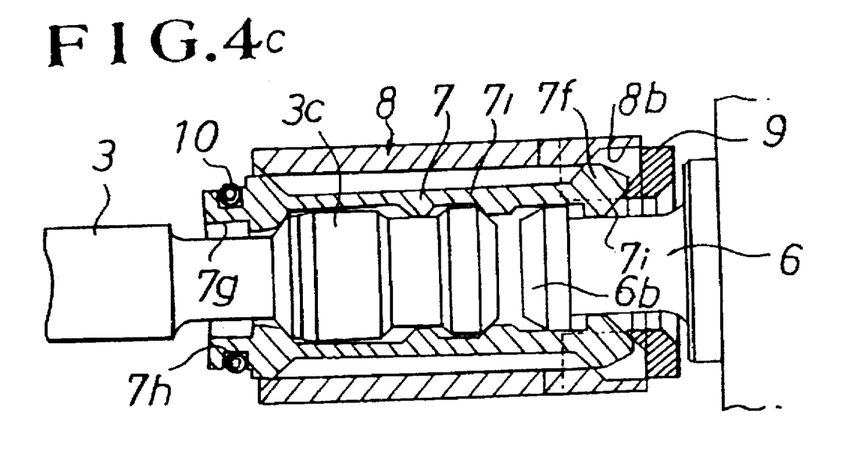

By continuing the retraction of the draw bar 3, the collet 7 retracts accordingly. As a result, the front outside projections 7f of the divided pieces $7_1$ of the collet 7 are retracted so as to be located on the rear side of the larger-inner-diameter portion 8b formed in the front end portion of the support sleeve 8, as shown in FIG. 4c, so that the divided pieces $7_1$ are brought from the state in which their front ends are opened into the state in which they become substantially parallel to one another.

Figure 5A:
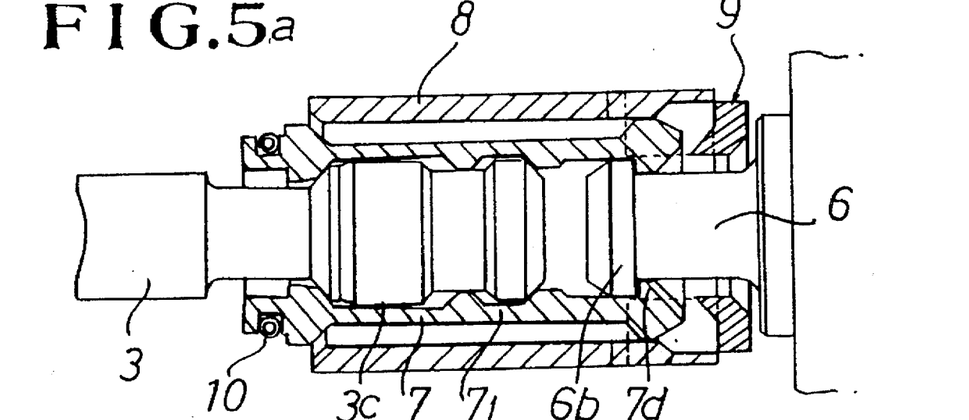
FIGS. 5a–5c are explanatory views of the article clamping apparatus shown in FIG. 1 which show the clamping operation.

When the draw bar 3 and the collet 7 continue their retracting operations, the rear end surfaces of the front inside projections 7d of the divided pieces $7_1$ of the collet 7 are engaged with the front end surface of the engagement portion 6b of the pull stud 6, as shown in FIG. 5a.

Figure 5B:
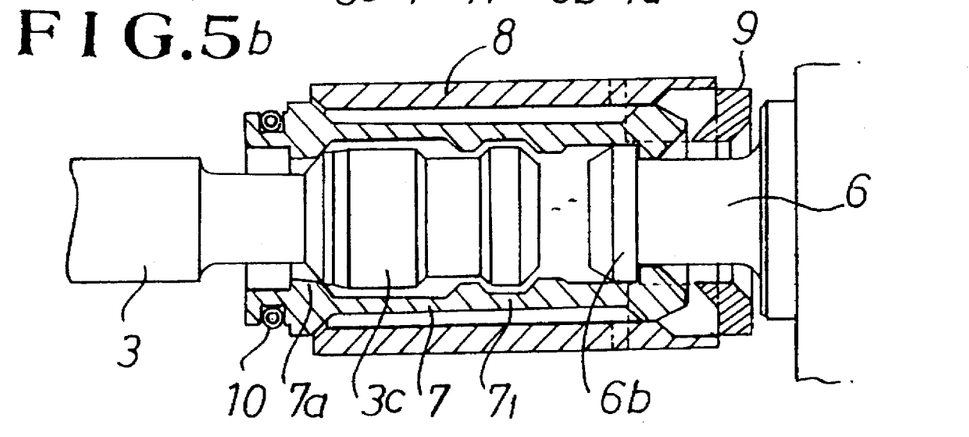

Further retraction of the draw bar 3 causes the tapered shank 6 of the tool holder 5 to contact the circumferential surface of the tapered bore 2a of the spindle 1 under pressure, so that the rear end surface of the holding portion 5a of the tool holder 5 abuts the front end surface of the spindle 1 (see FIG. 1). As a result, as shown in FIG. 5b, the slant rear end surface of the engagement portion 3c of the draw bar 3 runs onto the slant front surfaces of the rear inside projections 7a of the divided pieces $7_1$ of the collet 7.

Figure 5C:
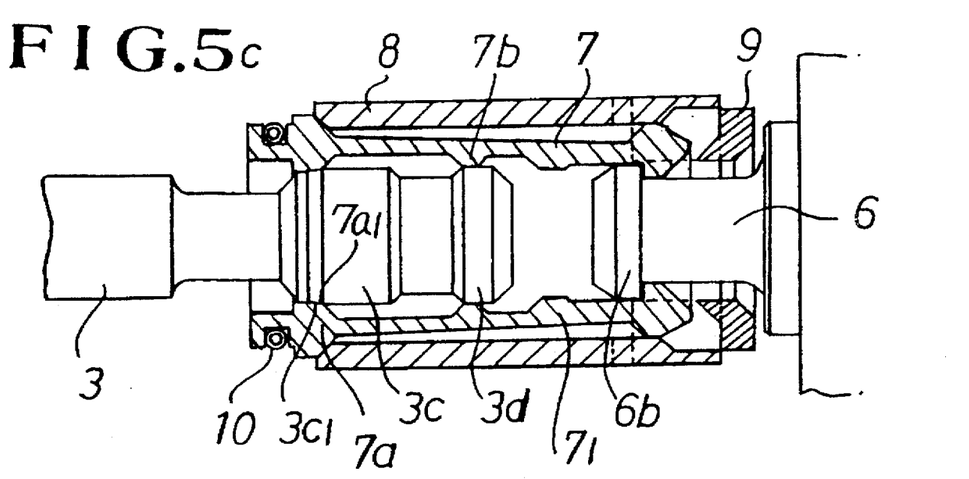

Subsequently, as shown in FIG. 5c, the gently slanted surfaces $3c_1$ formed on the rear portion of the outer circumferential surface of the engagement portion 3c of the draw bar 3 contacts, under pressure, the gently slanted surfaces $7a_1$ formed on the inner circumferential surfaces of the rear inside projections 7a of the divided pieces $7_1$ of the collet 7. As a result, the draw bar 3 enters into the drawn state in which the outer circumferential surface of the front end portion 3d of the draw bar 3 is engaged with the inner circumferential surfaces of the guide projections 7b of the divided pieces $7_1$ of the collet 7 so as to support them.

Figure 8:
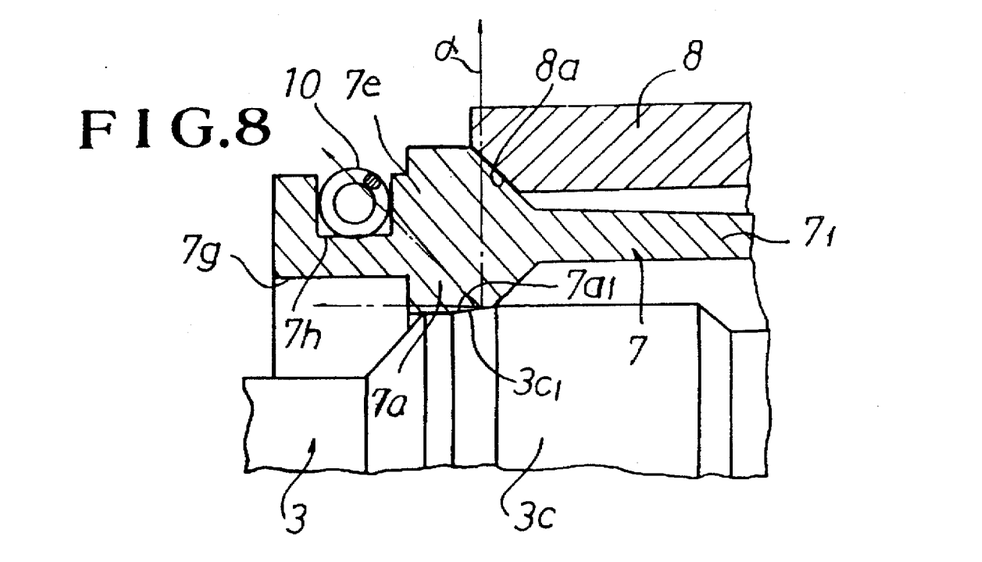
FIG. 8 is an explanatory vie of a force-increasing mechanism of the article clamping apparatus shown in FIG. 1.

In this state in which the draw bar 3 has been drawn, the draw bar 3 is urged rearward in the axial direction by the plurality of the disk springs. As a result, as shown in FIG. 8, the gently slanted surfaces $3c_1$, which is formed on the outer circumferential surface of the engagement portion 3c of the draw bar 3 such that its diameter decreases toward the rear side, and the gently slanted surfaces $7a_1$, which is formed on the inner circumferential surfaces of the rear inside projections 7a of the divided pieces $7_1$ of the collet 7 such that the inner diameter decreases toward the rear side, are contacted with each other under pressure at a small slant angle of about 10°. As a result, as indicated by arrow α in FIG. 8, a component force toward the outer circumference of the draw bar 3 is large, so that the engagement portion 3c presses the rear inside projections 7a toward the outer circumference of the collet 7 with a large force. In this manner, the tool holder 5 is clamped.

The rear end portions of the divided pieces $7_1$ are expanded, and the front end surfaces of the rear outside projections 7e projecting outward at the position corresponding to the rear inside projections 7a are brought into contact with the rear-end tapered surface 8a of the support sleeve 8 fixed to the spindle 1, at a slant angle of 45°, so that upon completion of clamping, the engagement portion 6b of the pull stud 6 can be held with an increased force a few times that of the disk springs. That is, the force-increasing mechanism 11 is formed at the front portion of the draw bar 3.

Accordingly, the divided pieces $7_1$ of the collet 7 can be securely fixed to the support sleeve 8. Also, thinner disk springs which fatigue less can be used as the above-described disk springs, and it is unnecessary to increase the number of the disk springs.

Figure 6A:
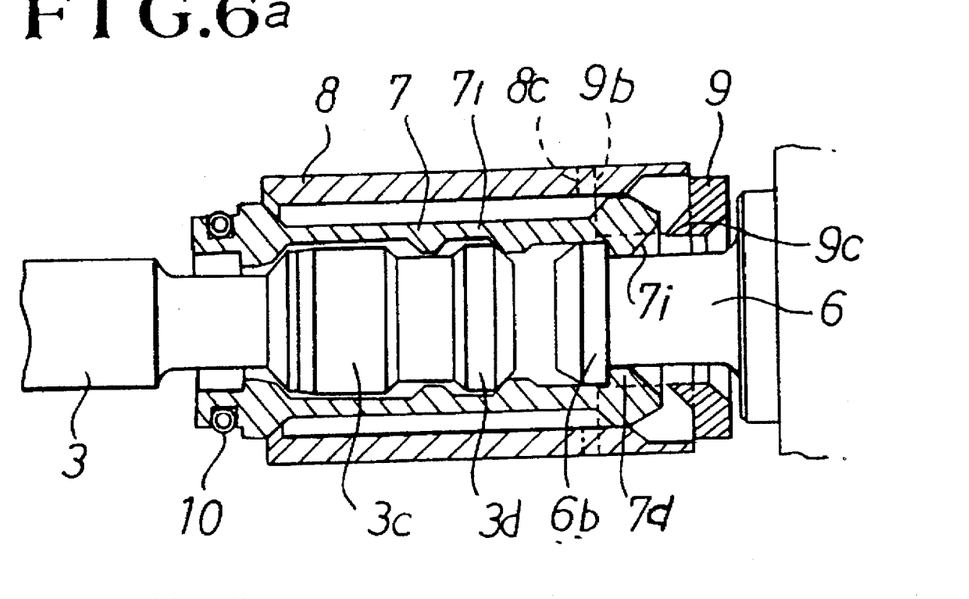
FIGS. 6a and 6b are explanatory views of the article clamping apparatus shown in FIG. 1 which show an unclamping operation.

While the tool holder 5 is in the clamped state, the spindle 1 is rotated to machine a workpiece, for example, through cutting, using a tool attached to the tool holder 5. Upon completion of the machining, the spindle 1 and other members are returned to their original positions so as to perform automatic tool change operation. This automatic tool change operation is performed as follows. The holding portion 5a of the tool holder 5 in the clamped state, as shown in FIG. 1 and FIG. 5c, is held by the automatic tool changer, and the hydraulic cylinder mechanism is operated to advance the draw bar 3, so that the front end surface of the front end portion 3d of the draw bar 3 is supported by the rear end surfaces of the engagement projections 7c of the divided pieces $7_1$ of the collet 7, as shown in FIG. 6a. Due to the spring force of the annular coil spring 10 fitted into the grooves 7h of the rear end projections 7e of the divided pieces $7_1$, each of the divided pieces $7_1$ is sightly inclined such that the diameter of the rear portion of the collet 7 decreases. As a result, a clearance is formed between the front portion of the draw bar 3 inserted inside the collet 7 and the divided pieces $7_1$ except for the front end surface of the front end portion 3d of the draw bar 3.

Figure 6B:
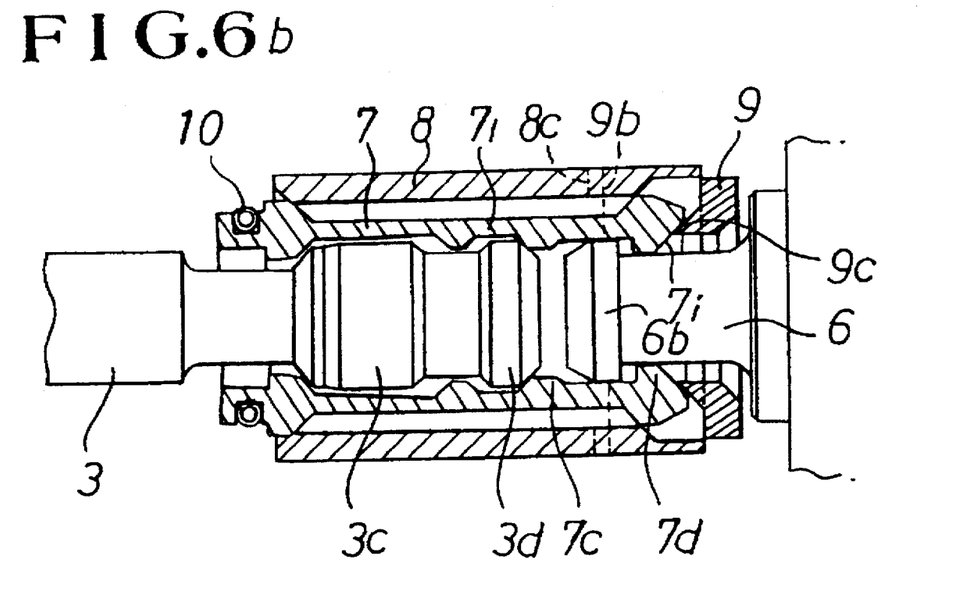

By continuing the advancement of the draw bar 3, as shown in FIG. 6b, the engagement projections 7c of the divided pieces $7_1$ are pushed out by the front end portion 3d of the draw bar 3 so as to advance the collet 7, so that the rear end surfaces of the front inside projections 7d of the divided pieces $7_1$ are separated from the front end surface of the engagement portion 6b of the pull stud 6. Further, the front end surface of the rear outside projections 7e of the divided pieces $7_1$ are moved forward into the rear end tapered surface 8a of the support sleeve 8, and the front end slant surfaces 7i of the front outside projections 7f of the divided pieces $7_1$ are contacted with the outer slant surfaces of the collet opening projections 9c of the separator 9. Moreover, the rear end surfaces of the front inside projections 7d of the divided pieces $7_1$ are separated from the front end surface of the engagement portion 6b of the pull stud 6.

Figure 7A:
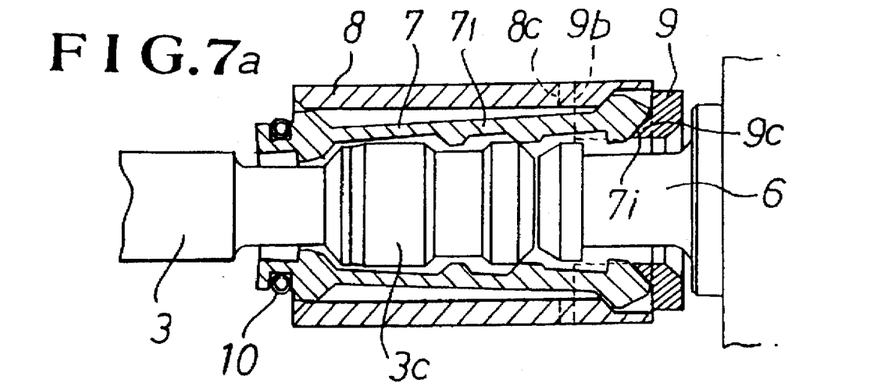
FIGS. 7a and 7b are explanatory views of the article clamping apparatus shown in FIG. 1 which show the unclamping operation.

By advancing the draw bar 3 further, the divided pieces $7_1$ are pushed out, as shown in FIG. 7a, so that the outer circumferential surfaces of the rear outside projections 7e of the divided pieces $7_1$ are engaged with the rear inner circumferential surface of the support sleeve 8 so as to be supported thereby. Also, the rear end surfaces of the front outside projections 7f of the divided pieces $7_1$ are slid on the inclined rear surface of the larger-inner-diameter portion 8b. At this time, the divided pieces $7_1$ are inclined such that their front side portions are opened, due to the spring force of the coil spring 10 and the action of the outer slant surfaces of the collet opening projections 9c to open the front end portions of the divided pieces $7_1$.

Figure 7B:
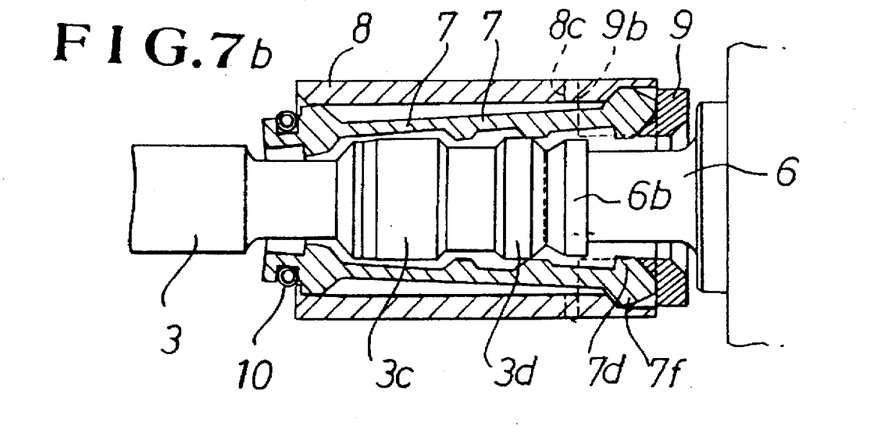

When the draw bar 3 is advanced to the advancement end position as shown in FIG. 7b, the front end surface of the front end portion 3d of the draw bar 3 contacts the rear end surface of the engagement portion 6b of the pull stud 6. In this advanced state, the outer surfaces of the front outside projections 7f of the divided pieces $7_1$ of the collet 7 abut the inner circumferential surface of the larger-inner-diameter portion 8b of the support sleeve 8, and the inner circumferential surfaces of the front inside projections 7d of the divided pieces $7_1$ are located, with clearance, on the radially outer side of the outer circumferential surface of the engagement portion 6b of the pull stud 6.

Subsequently, the automatic tool changer is operated so as to hold the holding portion 5a of the tool holder 5 and to pull out the tool holder 5 and the pull stud 6 toward the outside of the spindle 1 (rightward in FIG. 5). After that, a different tool holder held by the automatic tool changer is attached to the spindle 1 through the above-described operation shown in FIGS. 4a–4c, and FIGS. 5a–5c.

In the article clamping apparatus according to the first embodiment of the present invention, collet opening projections 9c each having a right-angle triangular shape are provided on the plate-shaped annular member 9a of the separator 9, and when the collet 7 is advanced, the front end slant surfaces 7i, which are formed on the front inside projections 7f of the divided pieces 7i, are engaged with the outer slant surfaces of the collet opening projections 9c. Therefore, the divided pieces $7_1$ can be reliably opened as shown in FIG. 7b.

Since the annular coil spring 10 is fit into the grooves provided in the rear end projections 7g of the divided pieces $7_1$ of the collet 7, the divided pieces $7_1$ can be inclined, upon the advance of the collet 7, such that the diameter of the collet 7 decreases at the rear side and increases at the front side. This makes it possible for the collet 7 to carry out opening operation in a stable manner, so that the engagement portion 6b of the pull stud 6 can be smoothly attached to and removed from the collet 7.

Figure 9:
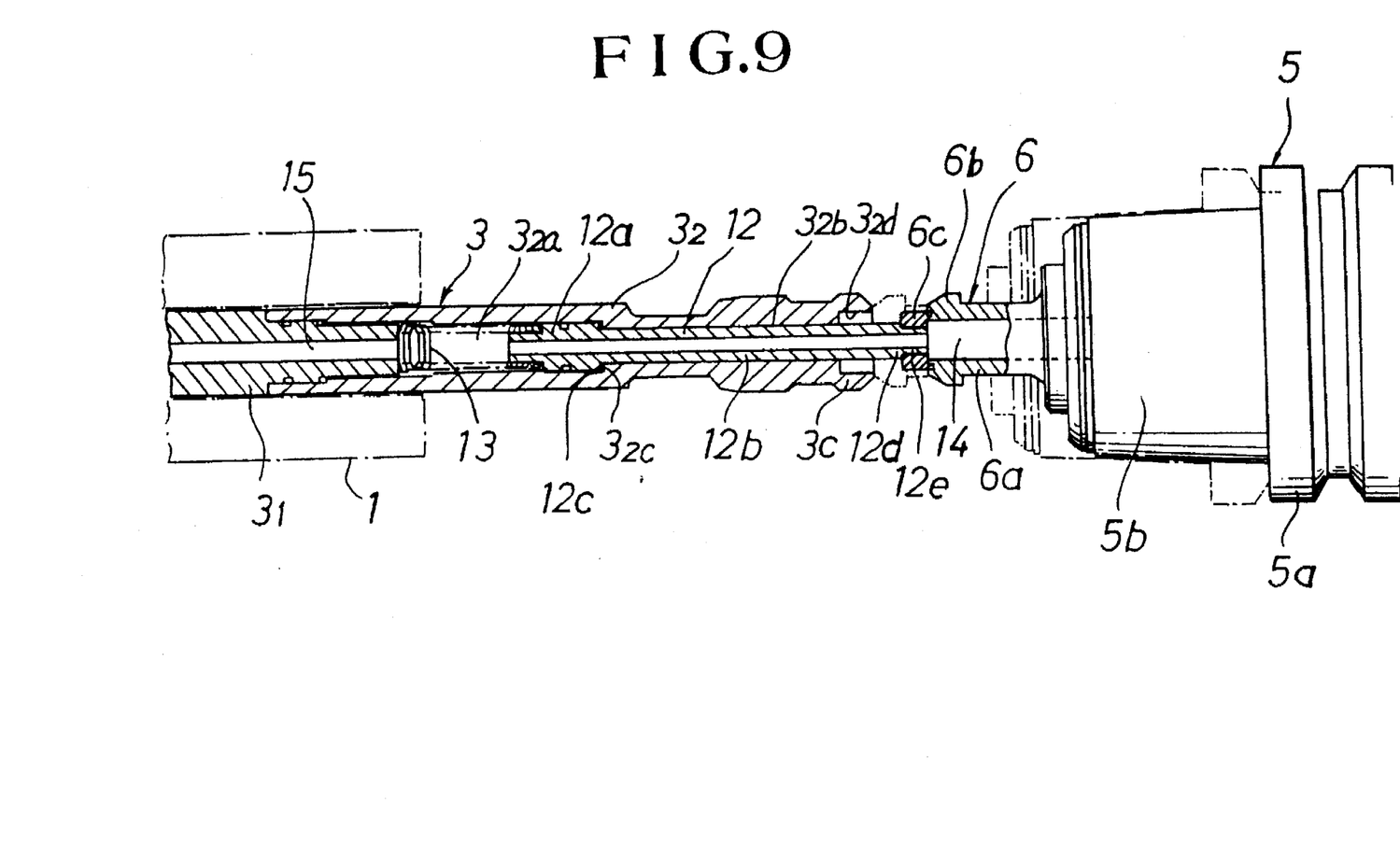
FIG. 9 is a partial longitudinal cross section of an article clamping apparatus for a spindle according to a second embodiment of the present invention.

FIG. 9 shows an article clamping apparatus according to the present invention. This clamping apparatus allows fluid such as cutting fluid and air for cleaning to be supplied from the draw bar 3 to the tool holder 5.

In detail, the rear end of a front bar $3_2$ is fitted and fixed to the front end of a rear bar $3_1$ so as to form the draw bar 3. A fluid feed pipe 12 is disposed inside the front bar $3_2$ such that the pipe 12 is movable in the axial direction. A larger diameter portion 12a formed at the rear portion of the fluid feed pipe 12 is fitted into a large-diameter-hole portion $3_{2a}$ of the front bar $3_2$, and the larger diameter portion 12a is urged forward by a pushing spring 13 having a coil shape which is supported by the front end of the rear bar $3_1$. A smaller diameter portion 12b is integrally extended from the front end of the larger diameter portion 12a via a stepped portion 12c. The smaller diameter portion 12b is fitted into a small-diameter-hole portion $3_{2b}$, which is formed on the front side of the large-diameter-hole portion $3_{2a}$ of the bar $3_2$ via a stepped portion $3_{2c}$. The front end portion of the smaller diameter portion 12b is projected from the front end of the front bar $3_2$. The smaller diameter portion 12b has a smaller-outer-diameter portion 12e formed at the front end of the smaller diameter portion 12b via a front end stepped portion 12d.

In the front bar $3_2$ is formed a depression $3_{2d}$ which is opened to the front end surface and surrounds the smaller diameter portion 12b. A tubular projection 6c, which is fitted into the depression $3_{2d}$, projects rearward from the engagement portion 6b of the pull stud 6. A fluid passage 14 which communicates with the tubular projection 6c is formed inside the pull stud 6 and the tool holder 5. The front end of the fluid passage 14 communicates with a proper location such as the bottom of an unillustrated tool receiving hole.

Moreover, a fluid supply hole 15 is formed at the central portion of the rear bar $3_1$ so as to extend in the axial direction. The front end of the fluid supply hole 15 communicates with the large-diameter-hole portion $3_{2a}$ of the front bar $3_2$, while rear end of the fluid supply hole 15 is connected to an unillustrated fluid supply source disposed outside the spindle 1 via a suitable means.

Except for the above-described portion, the structure of the article clamping apparatus according to the second embodiment is the same as that of the article clamping apparatus according to the first embodiment. Reference numerals in FIG. 9, which are the same as those used in FIGS. 1–3, denote the corresponding portions.

In the article clamping apparatus according to the second embodiment, when the tool holder 5 is in the clamped state, as indicated by a chain line in FIG. 9, the rear end surface of the engagement portion 6a of the pull stud 6 abuts the front end surface of the engagement portion 3c of the draw bar 3 located at the advanced position. As a result, the tubular projection 6c is fitted into the depression $3_{2d}$ provided in the front bar $3_2$ of the draw bar 3, and the small-outer-diameter portion 12e at the front end of the smaller diameter portion 12b of the fluid supply pipe 12 is fitted into the tubular projection 6c. Further, the front end of the small-outer-diameter portion 12e abuts the rear end surface of the engagement portion 6b of the pull stud 6, so that the fluid feed pipe 12 is retracted while its larger diameter portion 12a compresses the press spring 13.

When a workpiece is machined, pressurized cutting fluid discharged from the fluid supply source is fed from the fluid supply hole 15 formed in the rear bar $3_1$ into the fluid feed pipe 12 via the large-diameter hole $3_{2a}$ of the front bar $3_2$. The cutting fluid is then passed from the fluid feed pipe 12 to the fluid passage 14 which is continuously formed in the pull stud 6 and the tool holder 5, so that the cutting fluid is supplied to the bottom of the tool receiving hole of the tool holder 5, which is then supplied to the cutting edge portion of the tool. In this manner, the cutting edge portion of the tool and a portion of the workpiece which undergoes machining are cooled and/or lubricated.

The operation and effects of the clamping apparatus according to the second embodiment except for the above-dexcribed operation and effects are the same as those of the article clamping apparatus according to the first embodiment. Therefore, their descriptions will be omitted.

In the article clamping apparatus according to the second embodiment, it is possible to freely change the fluid passage formed in the tool holder by using conventional known means. For example, the fluid passage is branched so as to jet the cutting fluid from the tool holder toward the outer circumference of the cutting edge portions of the tool. Alternatively, air for cleaning is jetted to the tool instead of the cutting fluid so as to remove chips and the like adhering to the tool.

In the present invention, there are provided a spring for urging the draw bar forward and a force-increasing mechanism disposed at the front portion of the draw bar. Therefore, it is possible to use a coil spring instead of the plurality of disk springs.

In the present invention, although the number of the divided pieces of the collet can be freely changed, the collet is preferably divided into four pieces in the circumferential direction, as in the above-described embodiments.

Articles which are clamped by the clamping apparatus according to the present invention are not limited to tool holders disclosed in the above-described embodiments, and workpieces can be clamped by the clamping apparatus, provided that each of the workpieces has a tapered portion, a shaft portion projecting rearward from the tapered portion, and an engagement portion which is formed on the shaft portion and has a diameter larger than that of the shaft portion.

Obviously, numerous modifications and variations of the present invention are possible in light of the above teachings. It is therefore to be understood that within the scope of the appended claims, the present invention may be practiced otherwise than as specifically described herein.

What is claimed is:

1. An article clamping apparatus for a spindle of a machine tool, comprising:

a draw bar which is inserted into a spindle of a machine tool so as to be advanced and retracted;

a collet consisting of a plurality of divided pieces which are arranged in the circumferential direction and which are capable of being opened and closed, said collet being fitted onto said outer circumference of a front portion of said draw bar;

a support sleeve which is disposed to surround said collet and is fixed to said spindle; and a separator which is fixedly provided within said spindle so as to be situated on said front side of said support sleeve, wherein a tapered bore for receiving a tapered portion of an article is formed in said spindle so as to be located on the front side of said separator;

an engagement portion and a front end portion disposed on the front side of said engagement portion project from the outer circumference of the front portion of said draw bar;

a rear inside projection to be engaged with the rear side of the engagement portion of said draw bar, an engagement projection to be engaged with the front end portion of said draw bar, and a front inside projection disposed on the front side of said engagement projection project from the inner circumferential surface of each divided piece of said collet;

a rear outside projection and a front outside projection are formed on the outer circumferential surface of each divided piece of said collet;

a rear end tapered surface and a larger-inner-diameter portion are formed at rear and front end portions of said support sleeve, respectively;

positioning plates project from the rear surface of an annular member of said separator and are inserted between said divided pieces of said collet, said positioning plates being engaged with slit which are grooves formed in a front end portion of said support sleeve along the axial direction thereof; and the rear end surface of the front inside projection of said collet is engaged with and is disengaged from the front end surface of an engagement portion which is provided at the rear end of a shaft portion projecting rearward from the tapered portion of said article and which has a diameter larger than the shaft portion, and wherein a force-increasing mechanism is provided in which a first gently slanted surface, which is formed on the outer circumferential surface of the engagement portion of said draw bar such that the outer diameter of the first slant surface decreases toward the rear side, and a second gently slanted surface, which is formed on the inner circumferential surface of the rear inside projection of each divided piece of said collet such that the inner diameter of the second slant surface decreases toward the rear side, are contacted with each other under pressure when said draw bar is urged in a retracting direction;

collet opening projections project from the annular member of said separator to be situated between the positioning plates, said collet opening projections having outer slant surfaces which contact the front end slant surfaces which are formed at the front ends of the divided pieces of said collet and whose diameter decreases toward the rear side.

2. An article clamping apparatus according to claim 1, wherein said article is a tool holder to which a tool is attached.

3. An article clamping apparatus for a spindle of a machine tool, comprising:

a draw bar which is inserted into a spindle of a machine tool so as to be advanced and retracted;

a collet consisting of a plurality of divided pieces which are arranged in said circumferential direction and which are capable of being opened and closed, said collet being fitted onto said outer circumference of a front portion of said draw bar;

a support sleeve which is disposed to surround said collet and is fixed to said spindle; and a separator which is fixedly provided within said spindle so as to be situated on said front side of said support sleeve, wherein a tapered bore for receiving a tapered portion of an article is formed in said spindle so as to be located on the front side of said separator;

an engagement portion and a front end portion disposed on the front side of said engagement portion project from the outer circumference of the front portion of said draw bar;

a rear inside projection to be engaged with the rear side of the engagement portion of said draw bar, an engagement projection to be engaged with the front end portion of said draw bar, and a front inside projection disposed on the front side of said engagement projection project from the inner circumferential surface of each divided piece of said collet;

a rear outside projection and a front outside projection are formed on the outer circumferential surface of each divided piece of said collet;

a rear end tapered surface and a larger-inner-diameter portion are formed at rear and front end portions of said support sleeve, respectively;

positioning plates project from the rear surface of an annular member of said separator and are inserted between said divided pieces of said collet, said positioning plates being engaged with slit grooves which are formed in a front end portion of said support sleeve along the axial direction thereof; and the rear end surface of the front inside projection of said collet is engaged with and is disengaged from the front end surface of an engagement portion which is provided at the rear end of a shaft portion projecting rearward from the tapered portion of said article and which has a diameter larger than the shaft portion, and wherein a force-increasing mechanism is provided in which a first gently slanted surface, which is formed on the outer circumferential surface of the engagement portion of said draw bar such that the outer diameter of the first slant surface decreases toward the rear side, and a second gently slanted surface, which is formed on the inner circumferential surface of the rear inside projection of each divided piece of said collet such that the inner diameter of the second slant surface decreases, are contacted with each other under pressure;

collet opening projections project from the annular member of said separator to be situated between the positioning plates, said collet opening projections having outer slant surfaces which contact the front end slant surfaces which are formed at the front ends of the divided pieces of said collet and whose diameter decreases toward the rear side; and a rear end projection projecting rearward from the rear inside projection and the rear outside projection is formed on each divided piece of said collet, and an annular coil spring is fitted into a groove formed in the outer circumferential surface of the rear end projection so as to urge the rear portion of said collet in a direction such that the diameter of said collet decreases.

4. An article clamping apparatus according to claim 3, wherein said article is a tool holder to which a tool is attached.

5. An article clamping apparatus according to claim 1, wherein a fluid supply hole is formed at the central portion of said draw bar so as to extend in the axial direction, a fluid feed pipe communicating with the fluid supply hole is inserted into the front portion of said draw bar such that the fluid feed pipe is slidable in the axial direction, a press spring is disposed within said draw bar so as to urge the fluid feed pipe forward, the engagement portion provided at the rear end of the shaft portion of said article is removably inserted into a front end portion of the fluid feed pipe projecting from the front end of said draw bar, and while said article is in a clamped state, pressurized fluid discharged from a fluid supply source is fed to a fluid passage formed within said article via the fluid supply hole and the fluid feed pipe so as to supply the fluid to the front portion of said article.

6. An article clamping apparatus according to claim 3, wherein a fluid supply hole is formed at the central portion of said draw bar so as to extend in the axial direction, a fluid feed pipe communicating with the fluid supply hole is inserted into the front portion of said draw bar such that the fluid feed pipe is slidable in the axial direction, a press spring is disposed within said draw bar so as to urge the fluid feed pipe forward, the engagement portion provided at the rear end of the shaft portion of said article is removably inserted into a front end portion of the fluid feed pipe projecting from the front end of said draw bar, and while said article is in a clamped state, pressurized fluid such as cutting fluid discharged from a fluid supply source is fed to a fluid passage formed within said article via the fluid supply hole and the fluid feed pipe so as to supply the fluid to the front portion of said article.

* * * * *